United States Patent
Jiang et al.

(10) Patent No.: US 7,111,087 B2
(45) Date of Patent: Sep. 19, 2006

(54) STORAGE CONTROL SYSTEM AND OPERATING METHOD FOR STORAGE CONTROL SYSTEM

(75) Inventors: Xiaoming Jiang, Odawara (JP); Katsuyoshi Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 214 days.

(21) Appl. No.: 10/892,282

(22) Filed: Jul. 16, 2004

(65) Prior Publication Data
US 2005/0278581 A1 Dec. 15, 2005

(30) Foreign Application Priority Data
May 27, 2004 (JP) ............................. 2004-157365

(51) Int. Cl.
G06F 3/00 (2006.01)
G01R 31/28 (2006.01)
(52) U.S. Cl. ................................ 710/36; 714/6; 714/7
(58) Field of Classification Search .................... None
See application file for complete search history.

(56) References Cited

U.S. PATENT DOCUMENTS

| | | | |
|---|---|---|---|
| 5,155,845 A * | 10/1992 | Beal et al. ................. | 714/6 |
| 5,297,262 A * | 3/1994 | Cox et al. .................. | 710/36 |
| 5,379,278 A * | 1/1995 | Safadi ....................... | 370/221 |
| 5,812,754 A | 9/1998 | Lui et al. | |
| 5,903,913 A * | 5/1999 | Ofer et al. ................ | 711/156 |
| 5,922,077 A | 7/1999 | Espy et al. | |
| 6,044,444 A * | 3/2000 | Ofek ........................ | 711/162 |
| 6,408,358 B1 | 6/2002 | Uchiyama et al. | |
| 6,571,355 B1 | 5/2003 | Linnell | |
| 6,795,934 B1 | 9/2004 | Nagata et al. | |
| 6,898,202 B1 * | 5/2005 | Gallagher et al. ......... | 370/401 |
| 2003/0191890 A1 * | 10/2003 | Okamoto et al. .......... | 711/112 |
| 2003/0221061 A1 * | 11/2003 | El-Batel et al. ........... | 711/114 |
| 2003/0231420 A1 | 12/2003 | Kano et al. | |
| 2004/0036995 A1 | 2/2004 | Suzuki et al. | |
| 2004/0172489 A1 * | 9/2004 | Shikada ..................... | 710/15 |
| 2005/0010843 A1 | 1/2005 | Iwamitsu et al. | |
| 2006/0048018 A1 * | 3/2006 | Hosoya et al. ............. | 714/48 |

FOREIGN PATENT DOCUMENTS

| | | |
|---|---|---|
| JP | 2004-022058 | 6/2002 |
| JP | 2004-022059 | 6/2002 |

OTHER PUBLICATIONS

Du, David H.C., et al., "Emerging Serial Storage Interfaces: Serial Storage Architecture (SSA) and Fibre Channel—Arbitrated Loop (FC-AL)[1]", 1996, Distributed Multimedia Research Center[2] and Computer Science Department, University of Minnesota, pp. 1-20.

* cited by examiner

Primary Examiner—Kim Huynh
Assistant Examiner—Jasjit Vidwan
(74) Attorney, Agent, or Firm—Reed Smith LLP; Stanley P. Fisher, Esq.; Juan Carlos A. Marquez, Esq.

(57) ABSTRACT

Each disk enclosure 117 contains an ENC bypass 113A for a disk connector 111A, and PBC 101A and 103A, which perform selective switching to transfer data via either the disk connector 111A or the ENC bypass 113A. When the occurrence of an anomaly in the disk connector 111A is detected, the CTL 5A connected to the disk connector 111A asks the CTL 5B to bypass the disk connector 111A, whereupon the CTL 5B switches the data communication path from the disk connector 111A to the ENC bypass 113A by controlling the PBC 101A and 103A.

9 Claims, 15 Drawing Sheets

| ENC ENCLOSURE NUMBER | ENC NUMBER | MOUNTED YES/NO | USABILITY |
|---|---|---|---|
| 0 | 0 | YES | USABLE |
| | 1 | YES | UNUSABLE |
| 1 | 2 | YES | USABLE |
| | 3 | YES | USABLE |
| ⋮ | ⋮ | ⋮ | ⋮ |

| LUN | ACCESS FLAG | HDD NUMBER | ENC NUMBER |
|---|---|---|---|
| 0 | 1 | 0 | 0 |
| 1 | 0 | 1 | 0 |
| ⋮ | ⋮ | ⋮ | ⋮ |

STORAGE CONTROL SYSTEM AND OPERATING METHOD FOR STORAGE CONTROL SYSTEM

CROSS-REFERENCE TO PRIOR APPLICATION

This application relates to and claims priority from Japanese Patent Application No. 2004-157365, filed on May 27, 2004, the entire disclosure of which is incorporated herein by reference.

FIELD OF THE INVENTION

The present invention relates to a storage control system comprising a plurality of storage devices, and to an operating method for the storage control system.

BACKGROUND OF THE INVENTION

The storage control systems disclosed in Japanese Patent Applications Laid Open Nos. 2004-22058 and 2004-22059, for example, are known as storage control systems that comprise a plurality of disk drives.

Such storage control systems comprise a basic disk chassis and one or more additional disk chassis. The basic disk chassis comprises a controller, a plurality of disk drives, and a disk connector (port bypass circuit, for example) that connects the controller and the plurality of disk drives. The additional disk chassis are connected downstream of the basic disk chassis Each additional disk chassis comprises a plurality of disk drives, and a disk connector that is connected to the plurality of disk drives. A disk connector in one additional disk chassis is connected to a disk connector in an upstream additional disk chassis (or basic disk chassis). As a result of this constitution, the controller in the basic disk chassis is able to access the desired disk drive via one or more continuously linked disk connectors.

In the conventional storage control system above, when a fault arises with a certain disk connector, there are sometimes cases where access is then no longer possible not only to the plurality of disk drives connected to this disk connector but also to disk drives connected to any disk connector that lies downstream of the disk connector. For this reason, increased reliability of storage control systems is desirable.

SUMMARY OF THE INVENTION

Accordingly, it is an object of the present invention to improve the reliability of storage control systems in which two or more device connectors connected to a plurality of storage devices are continuously linked.

Further objects of the present invention will become apparent from the following description.

The storage control system according to the present invention comprises a plurality of storage devices for storing data; a controller that controls the writing of data to the storage devices and the reading of data from the storage devices; and a connection system that connects the controller to the plurality of storage devices. The connection system comprises two or more device connectors connected to the plurality of storage devices; two or more bypasses corresponding with the two or more device connectors respectively; and two or more path switching units, which each comprise the two or more bypasses, are connected to the two or more device connectors respectively, and perform selective switching to connect either the respective device connector connected to the path switching units themselves or a bypass of the device connector to the controller. The two or more path switching units are serially connected between the upstream side where the controller is present and the downstream side where the plurality of storage devices is present. Each of the two or more path switching units connects the device connector to the controller when the device connector connected to the path switching units themselves is normal, but switches the path connecting to the controller from the device connector to the bypass thereof when an anomaly occurs in the device connector. The controller accesses, via the bypass of the device connector exhibiting the anomaly, a device connector that exists further downstream than the device connector.

In one preferred embodiment, the controller and the connection system are multiplexed, respectively. The multiplexed controllers comprise first and second controllers. The multiplexed connection systems comprise a first connection system connected to the first controller and a second connection system connected to the second controller. Two or more device connectors included in the first connection system comprise a first device connector, and two or more device connectors included in the second connection system comprise a second device connector corresponding with the first device connector. The first device connector is provided with a corresponding first path switching unit, and the second device connector is provided with a corresponding second path switching unit. The first path switching unit is connected to the second controller, and the second path switching unit is connected to the first controller. The first controller detects the occurrence of an anomaly in the first device connector and sends a bypass command (a command based on a predetermined communication protocol, for example), which signifies an instruction to bypass the first device connector, to the second controller. The second controller receives the bypass command from the first controller and then sends a bypass request signal, which signifies a request to connect the bypass of the first device connector to the first controller, to the path switching unit corresponding with the first device connector. The path switching unit corresponding with the first device connector receives the bypass request signal and switches the path connecting to the first controller from the first device connector to the bypass thereof. In this case, for example, the first and second controllers may be connected to each other and connected to the host device of the storage control system. The first controller may receive write target data from the host device and, when the write destination of the received write target data is the storage device connected to the first device connector, transfer the received write target data to the second controller. The second controller may receive the write target data from the first controller and write the received write target data to the storage device connected to the first device connector via the second device connector.

In one embodiment, the controller and the connection system are multiplexed, respectively. The multiplexed controllers comprise first and second controllers. The multiplexed connection systems comprise a first connection system connected to the first controller and a second connection system connected to the second controller. Two or more device connectors included in the first connection system comprise a first device connector, and two or more device connectors included in the second connection system comprise a second device connector corresponding with the first device connector. The first device connector is provided with a corresponding first path switching unit, and the second device connector is provided with a corresponding second path switching unit. The first device connector is connected to the second path switching unit, and the second device connector is connected to the first path switching unit. The first controller detects the occurrence of an anomaly in the first device connector and sends a bypass command, which signifies an instruction to bypass the first device connector, to the second controller. The second controller receives the bypass command from the first controller and then sends a bypass request signal, which signifies a request to connect the bypass of the first device connector to the first controller, to the first path switching unit via the second device connector. The first path switching unit receives the bypass request signal and switches the path connecting to the first controller from the first device connector to the bypass thereof.

In one embodiment, the storage control system further comprises two or more power supplies corresponding with the two or more device connectors and the two or more path switching units; two or more power supply detection units for detecting the respective states of the two or more power supplies; and two or more power supply switching units corresponding with the two or more path switching units. Each of the two or more power supply detection units detects the fact that the respective power supply corresponding therewith is OFF, notifies the power supply switching unit of the path switching unit corresponding with the power supply, and sends, to the path switching unit corresponding with the power supply, a bypass request signal signifying a request to connect the bypass of the device connector corresponding with the path switching unit to the controller. Each of the two or more power supply switching units performs selective switching to adopt, for the path switching unit corresponding with the respective power supply switching unit, either the power supply corresponding with the path switching unit or the power supply corresponding with another path switching unit, receives notification from the respective power supply detection unit that the power supply of the path switching unit corresponding with the respective power supply switching unit is OFF, and then connects, to the path switching unit corresponding with the respective power supply switching unit, the power supply corresponding with a path switching unit other than the path switching unit.

In one embodiment, the two or more path switching units each comprise two bypass circuits connected to both ends of the bypass. The two bypass circuits are an upstream-side bypass circuit and a downstream-side bypass circuit. The upstream-side bypass circuit is connected to a device connector corresponding therewith and to a downstream-side bypass circuit of a path switching unit corresponding with a device connector further upstream than the device connector. The downstream-side bypass circuit is connected to a device connector corresponding therewith and to an upstream-side bypass circuit of a path switching unit corresponding with a device connector further downstream than the device connector.

In one embodiment, each of the two or more path switching units switch the path connecting to the controller from the bypass to a device connector when the device connector exhibiting an anomaly, which is connected to each of the path switching unit, has been restored.

In one embodiment, each of two or more device connectors comprises a fiber channel loop connected to a storage device. Two or more fiber channel loops are serially connected between the upstream side and the downstream side. Further, the path switching unit comprising a fiber channel loop bypass is provided between the fiber channel loop and an adjacent fiber channel loop.

BRIEF DESCRIPTION OF THE DRAWINGS

FIG. 3 shows an example of the constitution of an ENC management table 31A and LU management table 33A;

In FIG. 5.

DETAILED DESCRIPTION OF THE PREFERRED EMBODIMENT

An embodiment of the present invention will be described hereinbelow with reference to the drawings.

Figure 1:
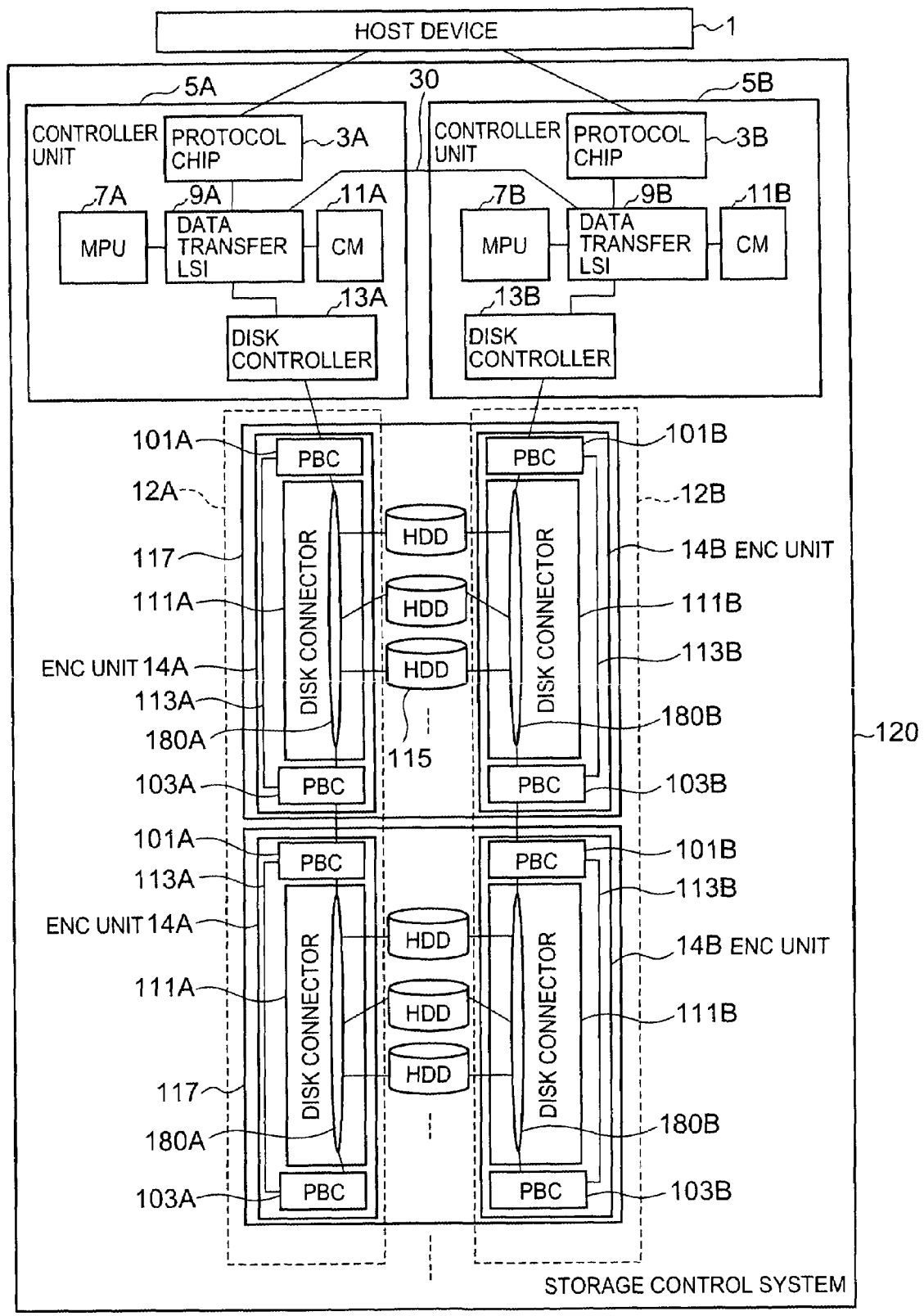
FIG. 1 shows the constitution of parts relating to the data transfer of the storage control system according to an embodiment of the present invention.

FIG. 1 shows the constitution of parts relating to the data transfer of the storage control system according to an embodiment of the present invention.

The storage control system 120 relating to this embodiment is, for example, a RAID (Redundant Arrays of Inexpensive Disks) system in which a plurality of storage devices is arranged in the form of an array. The storage control system 120 comprises duplicate controller units 5A and 5B, and a plurality of disk enclosures 117, 117, . . . , and so forth.

The controller units 5A and 5B have the same characteristics. Therefore, a description is provided by taking the controller unit 5A as a representative example, and the constitution of the controller unit 5B is also suitably described. The controller unit 5A comprises a protocol chip 3A, cache memory (sometimes abbreviated to 'CM' hereinbelow) 11A, a disk controller 13A, an MPU (Micro Processor Unit) 7A, and a data transfer LSI (Large-Scale Integration) 9A.

The protocol chip 3A controls the protocol for communications with the host device of the storage control system 120 (a personal computer or server machine, for example) 1.

The CM 11A temporarily stores data that is exchanged between the host device 1 and the storage control system 120. Further, as will be described subsequently, the CM 11A may store an ENC management table for managing ENC units (enclosures) 14A that belong to a first access system 12A, and an LU management table for managing one or a plurality of logical storage devices (hereinafter written as 'LU', which is short for 'logical unit') that are prepared on one or more HDD (hard disk drives) 115. Further, the first access system 12A comprises one access path among the duplicate access paths to the HDD 115 (in other words, the access path from the disk controller 13A to the HDD 155), whereas a second access system 12B exists in the storage control system 120, which comprises the other access path of the duplicate access paths to the HDD 115 (that is, the access path from the disk controller 13B to the HDD 155).

The disk controller 13A accesses any of the HDD 155 among the plurality of HDD 115 via the first access system 12A, under the control of the MPU3A. Meanwhile, the disk controller 13B accesses any HDD 155 among the plurality of HDD 115 via the second access system 12B under the control of an MPU3B.

The MPU 3A controls the overall operation of the controller unit 5A. For example, the MPU 7A receives an I/O request (abbreviated to 'I/O request' hereinafter, which is a write command or read command, for example) from the host device 1, and then performs data write processing or data read processing in response to the I/O request. In data write processing, MPU 3A writes write target data from the host device 1 to CM 11A and writes write target data written to the CM 11A to any HDD 115 among the plurality of HDD 115 via the disk controller 13A, for example. Further, in data read processing, for example, the MPU 7A reads read target data from any HDD 115 among the plurality of HDD 115 via the disk controller 13A, writes the read target data to the CM 11A, and then transfers the read target data written to the CM 11A to the host device 1. In addition, the content of the processing of the MPU3A described thus far is merely an example. Other processing can also be executed and will be described subsequently. Furthermore, in the following description, the transmission-source side of the write target data is known as the 'write upstream side', while the transmission destination side of the write target data is known as the 'write downstream side'.

The data transfer LS19A is connected to the protocol chip 3A, the CM 11A, disk controller 13A, and MPU 7A, and relays data that is exchanged therebetween. Further, the data transfer LS19A is connected to a data transfer LS19B in the controller unit 5B via a predetermined bus (called a 'dual bus' hereinafter) 30. As a result of this constitution, the MPU 7A is able to write write target data from the host device 1 not only to the CM 11A but also to the CM 11B in the other controller unit 5B via the dual bus 30 and data transfer LS19B, for example.

Each of the plurality of disk enclosures 117, 117, . . . comprises a plurality of HDD 115, and duplicate enclosures (ENC units hereinbelow) 14A, 14B. The ENC unit 14A (and 14B) comprise disk connectors 111A (and 111B) connected to a plurality of HDD 115, a bypass of the disk connector 111A (called 'ENC bypass' hereinbelow) 113A (and 113B), and port bypass circuits (abbreviated to 'PBC' hereinbelow) 101A, 103A (and 101B, 103B) connected at both ends of the ENC bypass 113A (and 113B).

The ENC units 14A and 14B will be described taking the ENC unit 14A as a representative example. ENC 14A collects and monitors management data relating to the resources of each HDD 115 in the disk enclosure 117 in which the ENC 14A is mounted. ENC 14A performs switch control for the connection between each HDD 115 and disk connector (PBC, for example) 11A, and controls PBC 101A and 103A, for example. In addition, for example, although not shown, the ENC unit 14A is electrically connected to a display lamp, which indicates the operating state of the storage control system 120, a power supply module, and a fan module, and so forth, and is capable of acquiring data relating to the states of respective modules and of sending control signals to each module. Data and control signals for each of these modules are stored in memory within the ENC unit 14A as resource data.

The disk connectors 111A and 111B have the same characteristics and therefore a description will be provided by taking the disk connector 111A as a representative example. The disk connector 111A performs switch control for a Fiber channel loop (Fiber Channel Arbitration Loop) 180A that forms a link between the disk controller 13A and each HDD 115. The disk connector 111A receives write target data from the write upstream side via the PBC 101A that exists further on the write upstream side than the disk connector 111A, and allows write target data to flow to the write downstream side via the PBC 103A that exists further on the write downstream side than the disk connector 111A.

PBC 101A and PBC 101B have the same characteristics and hence a description will be provided by taking PBC 101A as a representative example. Further, FBC 103A and PBC 103B also have the same characteristics and hence a description will be provided by taking PBC 103A as a representative example. The PBC 101A is provided on the write upstream side of the disk connector 111A (called the 'upstream-side PBC 101A' hereinafter), and is connected to the PBC 103A (or the disk controller 13A of the controller unit 5A) in the disk enclosure 117 that exists further on the write upstream side than the PBC 101A. Meanwhile, the PBC 103A is provided on the write downstream side of the disk connector 111A (called 'downstream-side PBC 103A' hereinbelow), and is connected to the upstream-side PBC 101A in the disk enclosure 117 that exists further on the write downstream side than the PBC 103A. The upstream-side PBC 101A and downstream side PBC 103A selectively switch the path for the data exchanged between the controller unit 5A and the HDD 115 that exist further on the write downstream side than the downstream side PBC 103A to either the Fiber channel loop 180A of the disk connector 111A and the ENC bypass 113A of the disk connector 111A. This switching is executed based on a control signal from at least one of the disk connectors 111A, 111B, and the controller units 5A and 5B, for example.

As a result of the above constitution, the upstream-side PBC 101A, disk connector 111A, and downstream-side PBC 103A are directly connected between the write upstream side and the write downstream side, and a plurality of sets of the serially connected upstream-side PBC 101A, disk connectors 11A, and downstream-side PBC 103A are connected in series. A bypass (ENC bypass) 113A of the disk connector 111A is connected between the upstream side PBC 101A and downstream side PBC 103A. The PBC 101A and 103A selectively switch the transfer of data via either the disk connector 111A or the ENC bypass 113A. As a result of this constitution, even when the disk connector 111A fails and data can no longer be communicated via the disk connector 111A, for example, by switching the data communication path from the disk connector 111A to the ENC bypass 113A by controlling the PBC 101A and 103A, data can be exchanged between the controller unit 5A and the HDD 115 that exist on the write downstream side of the disk connector 111A.

This embodiment will be described in detail below.

Figure 2:
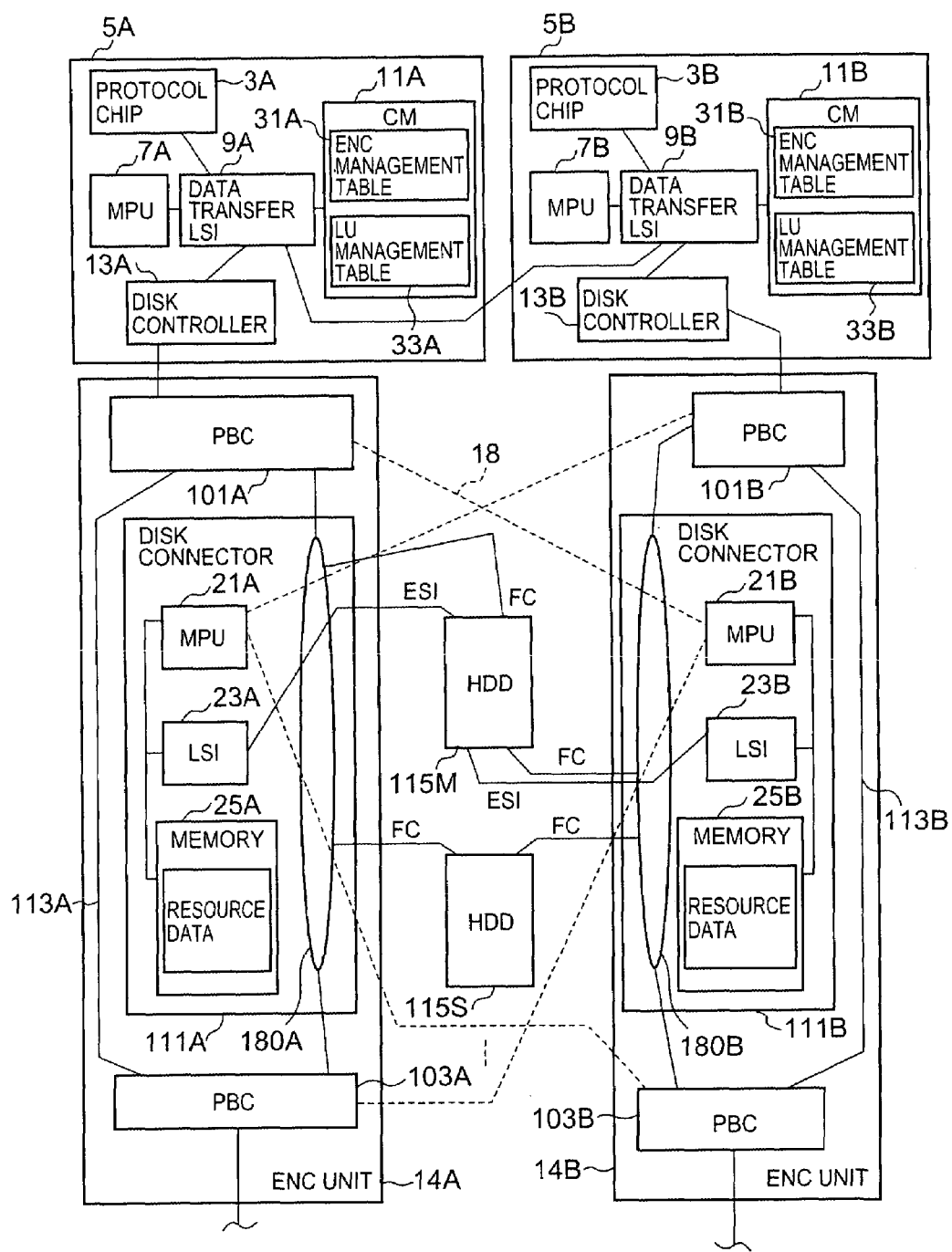
FIG. 2 shows in detail the constitution of the storage control system 120 shown in FIG. 1.

FIG. 2 shows the constitution of the storage control system 120 shown in FIG. 1 in detail.

Each of the PBC 101A, 101B, 103A, and 103B is connected to a path switching control line 18, and functions as one type of switch device, for example. Upon receiving the bypass instruction via a path switching control line 18, the PBC 101A, 101B, 103A and 103B each select the ENC bypass 113A or 113B as the data transmission path, and, upon receiving a bypass cancellation instruction via the path switching control line 18, select the disk connector 111A or 111B as the data transmission path.

Each HDD 115 of the plurality of HDD 115 is connected to the disk connectors 111A and 111B via a first interface such as a fiber channel. The plurality of HDD 115 comprises one or more HDD that are to become SES (SCSI Enclosure Service) nodes (main HDD hereinbelow) 115M and the remaining HDD (subHDD hereinbelow) 115S. In addition to the disk connectors 111A and 111B, the main HDD 115M is connected to an LSI23A in the disk connector 111A and an LSI23B in the disk connector 113B via a second interface such as an ESI (Enclosure Service I/F).

The disk connector 111A comprises an MPU 21A for controlling the operation of the disk connector 111A, the LSI23A connected to the main HDD 115M, and a memory 25A for storing resource data and so forth. The disk connector 111A is, for example, electrically connected to a power supply module, fan module, and so forth, in the disk enclosure 117 in which the disk connector 111A is mounted. The MPU 21A captures data relating to the state of each module as resource data and writes this data to the memory 25A, and sends a control signal based on the resource data written to the memory 25A to each module (sends a control signal based on the temperature in the disk enclosure 117 to the fan module, for example).

An ENC management table 31A for managing each ENC unit 14A constituting a management target of the controller unit 5A, and an LU management table 33A for managing the LU prepared on the plurality of HDD 115 are stored in the CM 11A of the controller unit 5A. Likewise, an ENC management table 31B for managing each ENC unit 14B constituting a management target of the controller unit 5B, and an LU management table 33B for managing the LU prepared on the plurality of HDD 115 are stored on the CM 11B of the controller unit 5B. Of the ENC management tables 31A and 31B, the ENC management table 31A will be described as a representative example, and, of the LU management tables 33A and 33B, the LU management table 33A will be described by way of example.

FIG. 3 shows an example of the constitution of the ENC management table 31A and LU management table 33A.

As shown in FIG. 3(A), a plurality of disk enclosure numbers for identifying each of the plurality of disk enclosures 117 mounted in the storage control system 120 is registered in the ENC management table 31A. In addition, registered in the ENC management table 31A for this plurality of disk enclosures 117 are: ENC numbers for identifying each of the ENC units 14A and 14B mounted in the disk enclosure 117, information indicating whether the ENC unit 14A or 14B is mounted in the disk enclosure 117, and information indicating whether the mounted ENC units 14A and 14B are in a usable state.

As shown in FIG. 3(B), registered in the LU management table 33A for each of the plurality of LU are: numbers for identifying the LU ('LUN' hereinbelow), access flags indicating whether the LU are accessible, HDD numbers for identifying the HDD 115 comprising the LU, and ENC numbers corresponding with the ENC unit 14A or 14B capable of accessing the LU. In the event that the corresponding ENC unit is in an unusable state, for example, the access flag is upright (that is, this means that the LU corresponding with the ENC unit is inaccessible). When the corresponding ENC unit is in a usable state, the access flag is lowered (that is, this means that the LU corresponding with the disk connector is inaccessible).

Figure 4:
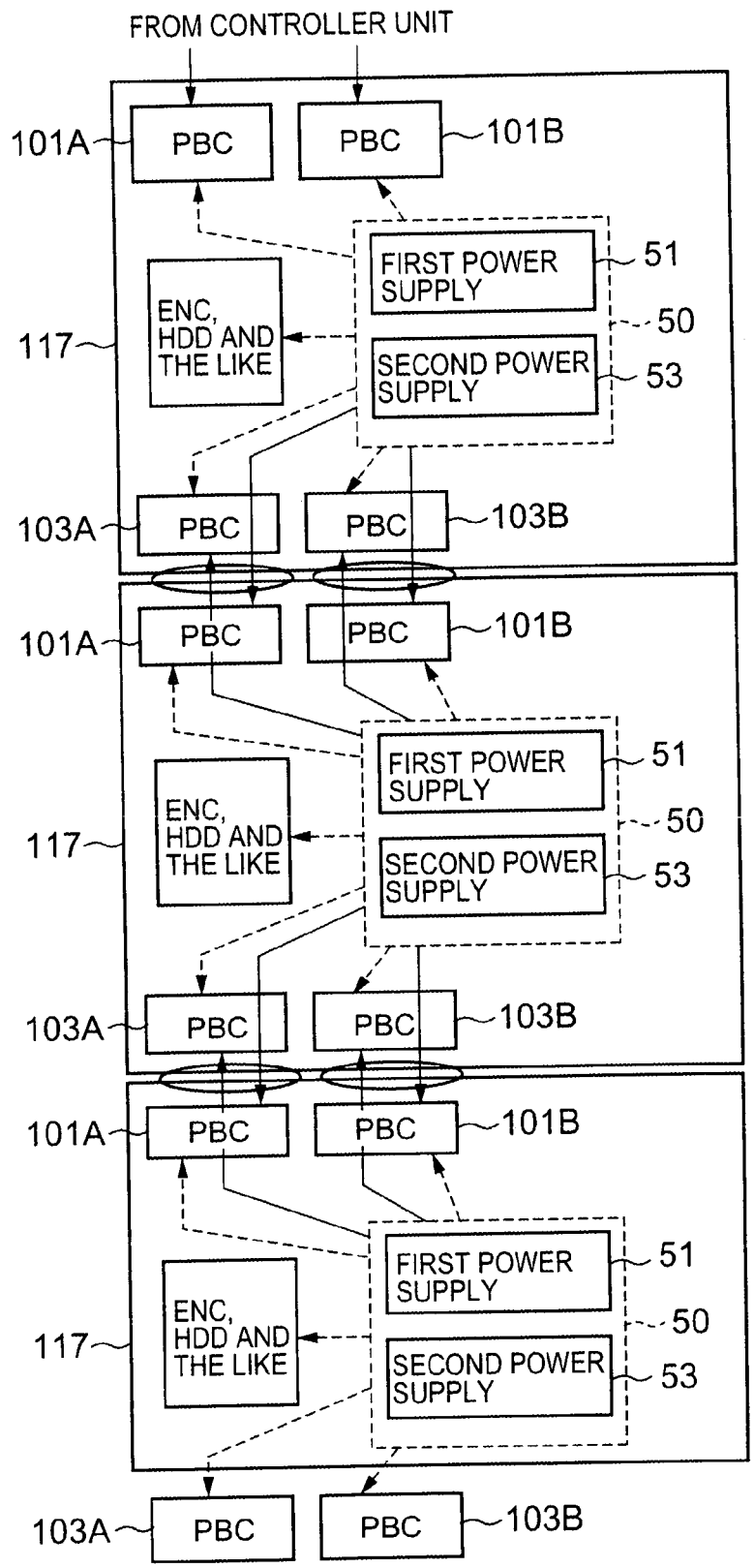
FIG. 4 shows the constitution of parts relating to the power supply system of the storage control system according to an embodiment of the present invention.

FIG. 4 shows the constitution of parts relating to the power supply system of the storage control system according to this embodiment.

A power supply set 50 is prepared for each of the disk enclosures 117. The power supply set 50 contains duplicate power supply modules 51, 51. As indicated by the dotted line arrows, the power supply modules 51, 51 supply electric power to each constitutional element within the corresponding disk enclosure 117, such as to the disk connectors 111A, 111B, the HDD 115, the upstream-side PBC 101A and 101B and the downstream-side PBC 103A and 103B, for example. Furthermore, as indicated by the solid line arrows, the power supply modules 51, 51 also supply electric power to the PBC ((101A and 101B) or (103A and 103B)) of another disk enclosure 117 that exists further on at least one of the write upstream side and write downstream side than the disk enclosure 117 corresponding with the power modules 51, 51. Stated differently, the power supply modules 51, 51 also supply electric power to other PBC ((101A and 101B) or (103A and 103B)) connected to the PBC of the disk enclosure 117 corresponding with the power supply modules 51, 51. Stated from another perspective, the upstream-side PBC 101A and 101B are able to accept a supply of electric power from either the power supply modules 51, 51 corresponding with the disk enclosure 117 that comprises the upstream side PBC 101A and 101B or the power supply modules 51, 51 corresponding with the disk enclosure 117 that exists further on the write upstream side than this disk enclosure 117 (that is, the disk enclosure immediately before this disk enclosure 117) (further, the leading upstream-side PBC 101A and 101B receive a supply of electric power from at least one of the controller units 5A and 5B, for example). The downstream-side PBC 103A and 103B are able to receive a supply of electric power from either the power supply modules 51, 51 corresponding with the disk enclosure 117 that comprises the PBC 103A and 103B, or the power supply modules 51, 51 corresponding with the disk enclosure 117 that exists further on the write downstream side than the disk enclosure 117 (that is, the disk enclosure that lies directly after same) (further, the final downstream-side PBC 103A and 101B receive a supply of electric power from only the power supply modules 51, 51 that correspond with the PBC 103A and 101B, for example).

Figure 5A:
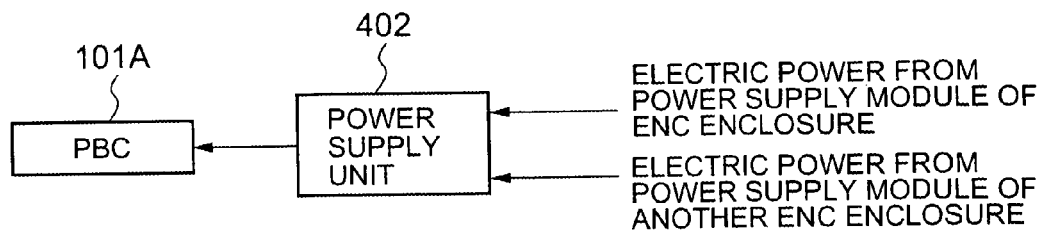
FIG. 5(A) shows an example of a PBC power supply system.
Figure 5B:
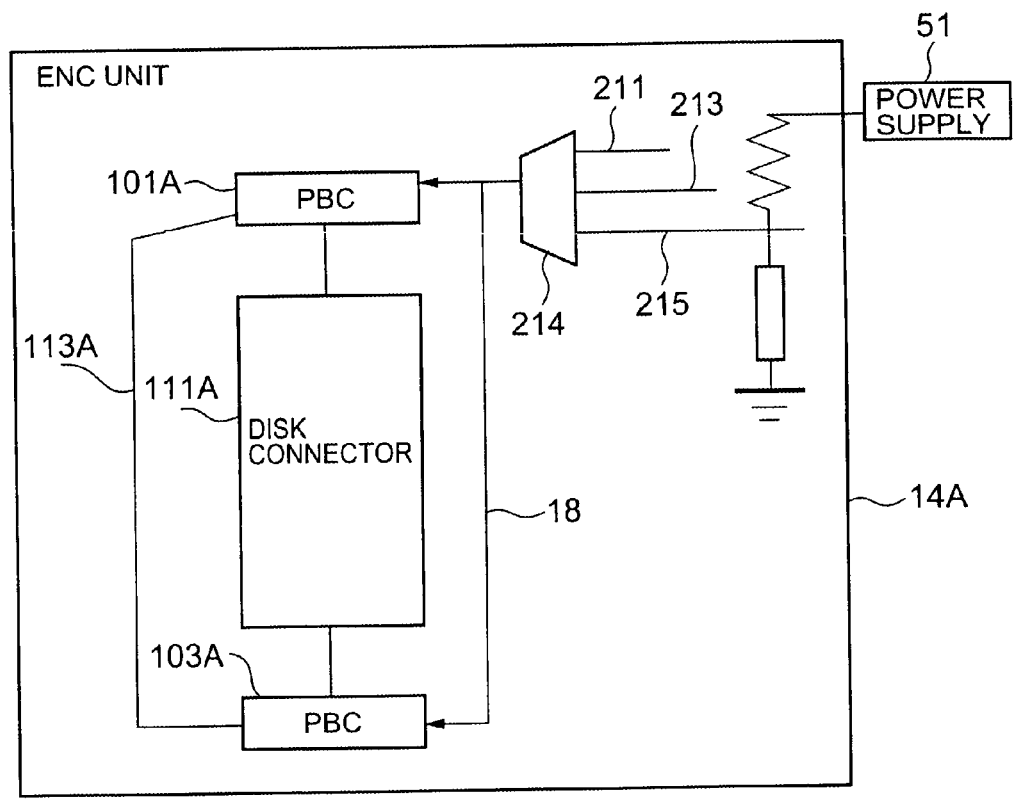
FIG. 5(B) shows an example of a PBC control system.

FIG. 5(A) shows an example of a PBC power supply system, and FIG. 5(B) shows an example of the PBC control system. PBC 101A is shown representatively in FIG. 5(A), and PBC 101A and 103A are shown representatively in FIG. 5(B).

As shown in FIG. 5(A), a power supply unit 402 is provided between the PBC 101A, and the power supply modules 51, 51 of the disk enclosure 117 comprising the PBC 101A and the power supply modules 51, 51 of another disk enclosure (more specifically, the disk enclosure that lies further on the write upstream side than the disk enclosure 117) 117. The power supply unit 402 supplies the electric power from the power supply modules 51, 51 of the disk enclosure 117 and the electric power from the power supply modules 51, 51 of another disk enclosure 117 to the PBC 101A. Further, the power supply unit 402 supplies further electric power to the PBC 101A when one source of electric power is shut off.

As shown in FIG. 5(B), a command-source switching unit 214 is provided for the PBC 101A and 103A. Connected to the input side of the command-source switching unit 214 are: a first command line 211 for inputting a command from the disk connector 111A or 111B, a second command line 213 for inputting a command from another disk connector 111A or 111B (the disk connector 111A or 111B in the disk enclosure 117 next to the write upstream side, for example), and a voltage signal line 215 for inputting a voltage signal at a level corresponding with the power supply state of the power supply modules 51, 51 of the disk enclosure 117. The voltage signal line 215 is connected to a specified terminal of the power supply modules 51, 51 via a pull-up resistor 218. The path switching control line 18 is connected to the output side of the command-source switching unit 214.

When the power supply of the power supply modules 51, 51 of the disk enclosure 117 are turned OFF, a low-level voltage signal is inputted to the command-source switching unit 214 and the command-source switching unit 214 then sends a bypass instruction to the PBC 101A and 103A via the path switching control line 18. When, on the other hand, the power supply of the power supply modules 51, 51 of the disk enclosure 117 is switched from an OFF state to an ON state, a high-level voltage signal is inputted to the command-source switching unit 214 and the command-source switching unit 214 then sends a bypass cancellation instruction to the PBC 101A and 103A via the path switching control line 18.

The constitution of the storage control system 120 was described above. The above constitution is merely an example. Other constitutions may also be adopted.

The process flow that is executed by the storage control system 120 will be described below.

Figure 6:
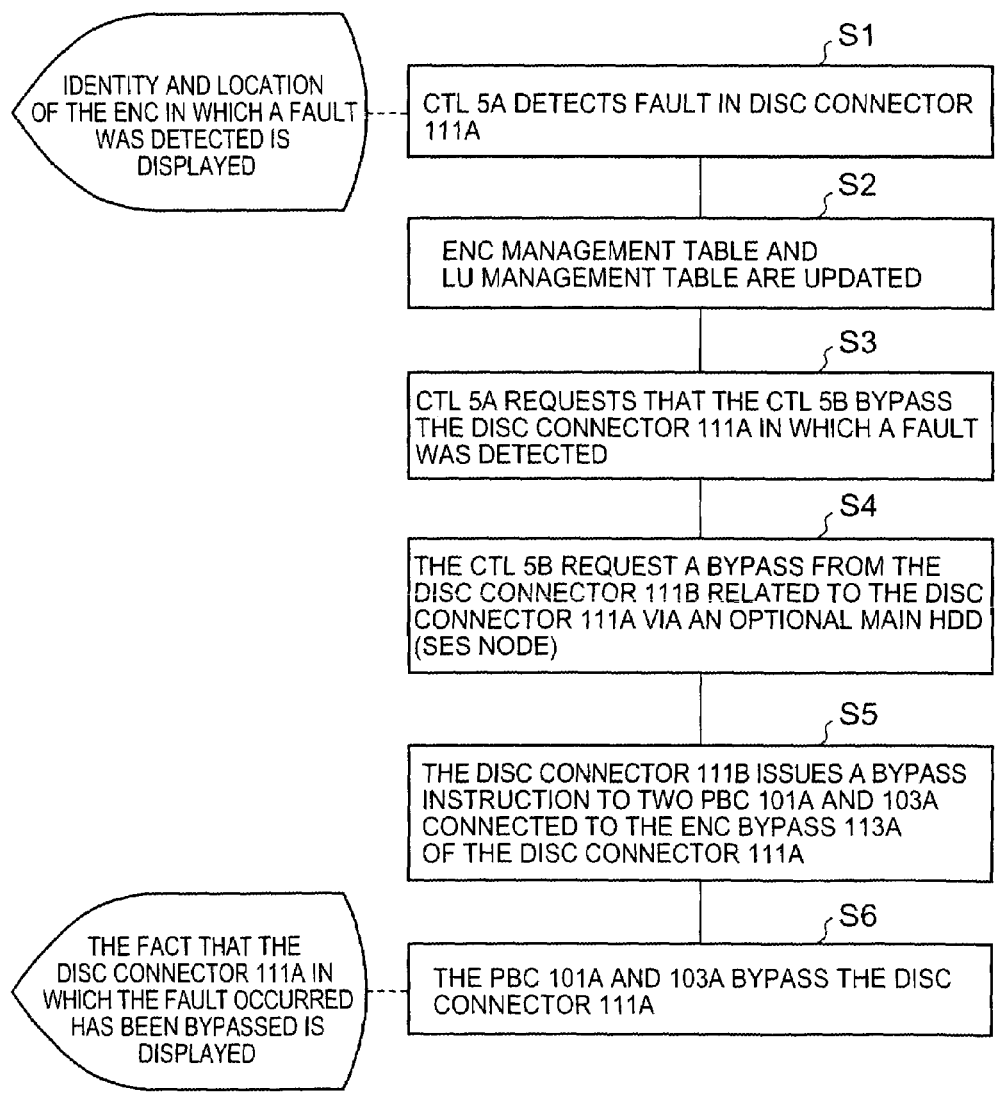
FIG. 6 shows an example of the process flow that is executed when a fault occurs with disk connector 111A.

FIG. 6 shows an example of the process flow that is executed when a fault occurs with disk connector 111A. FIG. 7 serves to illustrate the switching of the communication path between PBC 101A and 103A. Further, in the following description, 'controller unit' will appear as 'CTL' for the sake of convenience.

Figure 7A:
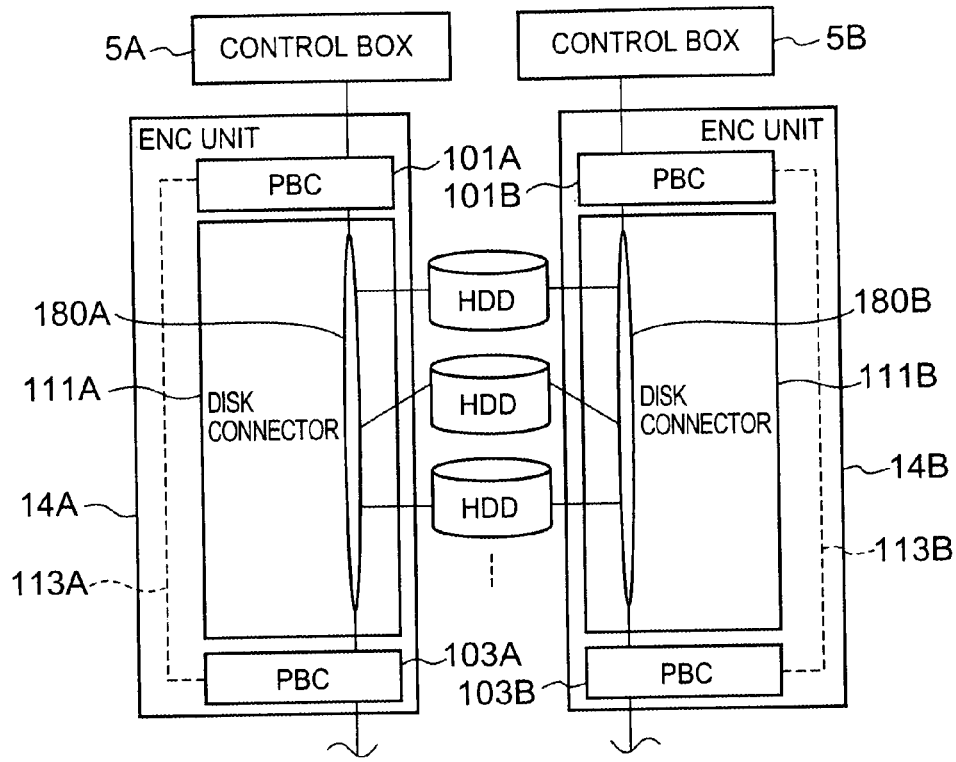
FIG. 7 serves to illustrate the switching of the communication path between the PBC 101A and 103A.

As shown in FIG. 7(A), when the leading disk connector 111A on the write upstream side is operated without breaking down, for example, a state where the fiber channel loop 180A of the disk connector 111A is selected, as indicated by the solid line, as the communication path between the PBC 101A and 103A, then exists and the ENC bypass 113A is in an unselected state, as indicated by the dotted line.

Figure 7B:
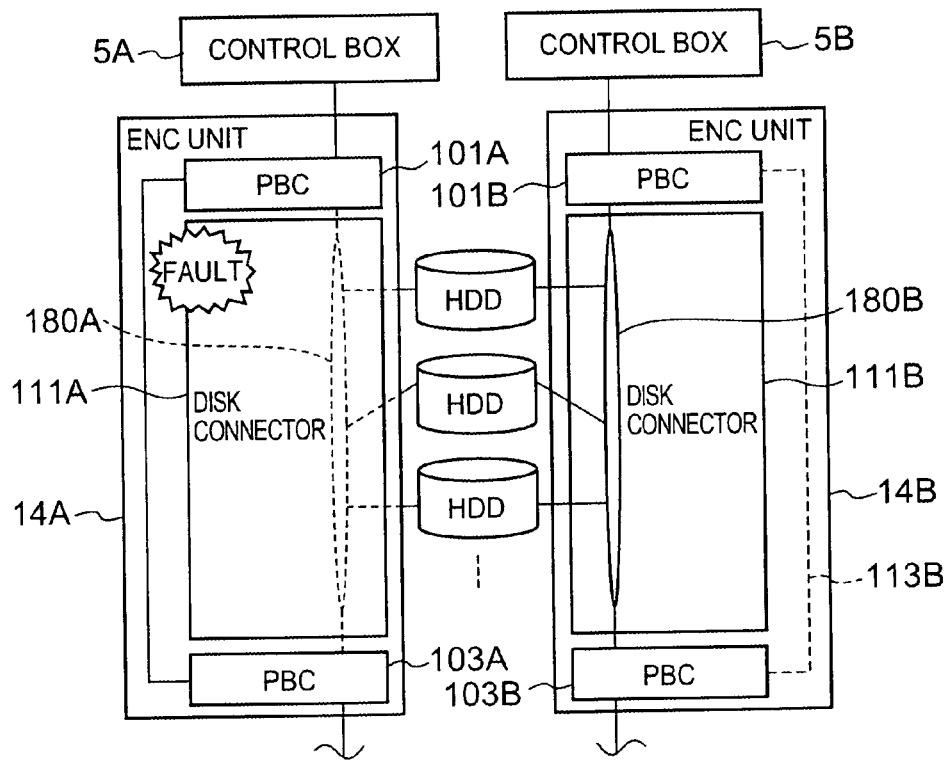

In this state, in a case where a fault arises with the leading disk connector 111A on the write upstream side (stated differently, the fiber channel loop 180A, for example) for example, as shown in FIGS. 6 and 7(B), CTL 5A is detected by means of a predetermined method (step S1). More specifically, for example, when the CTL 5A has been unable to access the SES node (main HDD 115M) via the leading disk connector 111A on the write upstream side, a fault with the disk connector 111A is judged to have occurred (access to the SES node via a disk connector is called 'SES access' hereinbelow). Upon detecting a fault with the disk connector 111A, the CTL 5A may display, on a display screen such as that of a management terminal (not shown) connected to the storage control system 120, where and in which of the plurality of disk connectors provided in the storage control system 120 the disk connector 111A in which the fault was detected exists.

Next, the MPU 7A of the CTL 5A updates (S2) the content of the ENC management table 31A, LU management table 33A, and so forth, based on the ENC number of the ENC unit 14A in which the disk connector 111A in which the fault was detected is mounted, the number of the disk enclosure 117 in which the ENC unit 14A is mounted, and so forth. More specifically, for example, the MPU 7A of the CTL 5A updates usability information corresponding with the ENC number and disk enclosure number for the disk connector 111A in which the fault was detected to information signifying that the disk connector 111A is unusable, and establishes a state in which the access flag corresponding with the ENC number is raised. Further, the MPU 7A of the CTL 5A may update at least one of the ENC management table 31B and LU management table 33B of the CTL 5B via the dual bus 30.

Next, the CTL 5A asks (S3) the CTL 5B for a bypass of the disk connector 111A in which the fault was detected. In this case, for example, the CTL 5A reports the disk enclosure number and ENC number of the disk connector 111A to the CTL 5B.

The CTL 5B, which has received this request, then selects an optional main HDD 115M from among one or more main HDD 115M, and requests a bypass (S4) from the disk connector 111B that is related to the disk connector 111A in which the fault was detected via the main HDD 115M (that is, the disk connector 111B in the same disk enclosure 117 as the disk connector 111A).

The disk connector 111B, which has received this request, then issues a bypass instruction (S5) to the PBC 101A and 103A of the disk connector 111A in which the fault was detected, via the path switching control line 18.

Next, the PBC 101A and 103A, which have received the bypass instruction, bypass the disk connector 111A (S6). That is, as indicated by the solid lines in FIG. 7(B), the PBC 101A and 103A switch the communication path between the PBC 101A and 103A from the fiber channel loop 180A of the disk connector 111A to the ENC bypass 113A. Here, the CTL 5A or 5B may display the fact that the disk connector 111A exhibiting the fault has been bypassed on a display screen such as that of a management terminal (not shown) connected to the storage control system 120.

Therefore, in a state where a fault has occurred with the disk connector 111A, in cases where the CTL 5A receives a write command to write write target data to an LU on the HDD 115 connected to the disk connector 111A exhibiting the fault, for example, because the disk connector 111A has failed, it is not possible to perform normal data write processing such as processing to write write target data written to the CM 11A to the LU via the disk connector 111A, for example. Hence, in this case, the CTL 5A identifies the fact that the LU is inaccessible from the LU management table 33A and writes the write command and write target data to the CM 11B via the dual bus 30, for example. In this case, in response to the write command thus written to the CM 11B, the CTL 5B writes write target data to the LU designated by the write command via the disk connector 111B that has not failed. Further, in a case where the CTL 5A writes write target data to the LU that lies further on the write downstream side than the disk connector 111A, write target data can be transferred further on the write target downstream side via the PBC 101A, ENC bypass 111A and PBC 103A. Further, when the CTL 5A receives a read command, if read target data is stored in the LU on the HDD 115 connected to the disk connector 111A exhibiting the fault, write target data may be acquired from the LU via the disk connector 111B by means of a process that is the same as that used when writing. The process method for writing write target data or reading read target data is not limited to this process method. A variety of other methods can be adopted.

Figure 8:
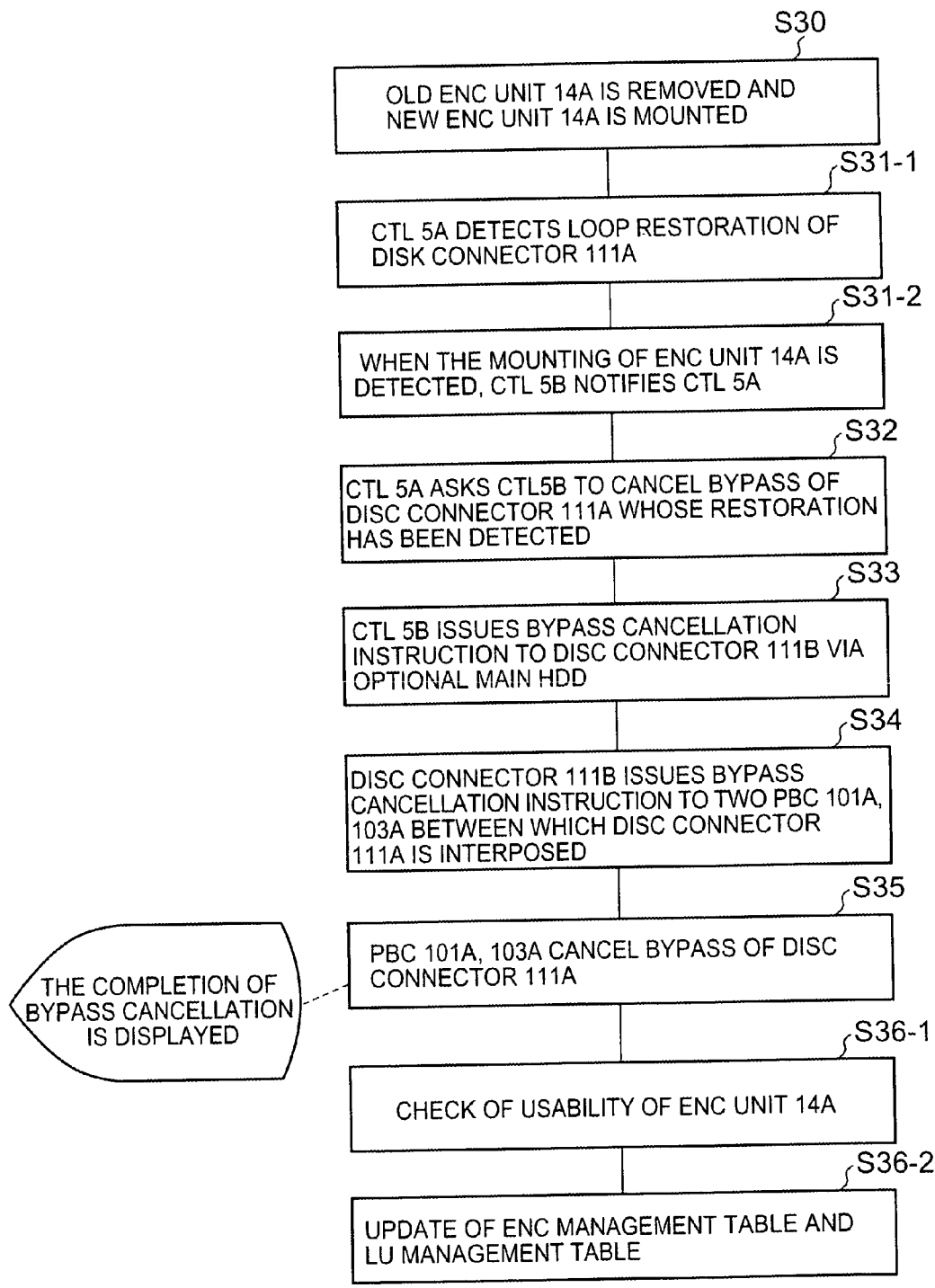
FIG. 8 shows an example of the process flow that is executed when the disk connector 111A exhibiting the fault is restored.

FIG. 8 shows an example of the process flow that is executed when the disk connector 111A exhibiting a fault is restored.

When the ENC unit 14A comprising the disk connector 111A exhibiting the fault is removed and a new ENC unit 14A is mounted (S30), the CTL 5A detects this replacement by means of a predetermined method (S31-1). As this predetermined method, a method in which the new disk connector 111A thus exchanged sends a mounting notification to the CTL 5B via the main HDD 115M can be adopted, for example. Upon detecting that the ENC unit 14A has been mounted, the CTL 5B reports this fact to the CTL 5A (S31-2). The CTL 5A thus identifies the fact that the disk connector 111A is usable (that is, the loop has been restored). The CTL 5A may then display the disk connector 111A for which loop restoration has been detected among the plurality of disk connectors that the storage control system 120 comprises on a display screen such as that of a management terminal (not shown) connected to the storage control system 120.

Further, when the disk connector 111A is usable, the CTL 5A then asks the CTL 5B (S32) to cancel the bypass of the disk connector 111A for which loop restoration was detected. In this case, for example, the CTL 5A reports the disk enclosure number and ENC number of the disk connector 111A to the CTL 5B.

Next, the CTL 5B, which has received this request, selects an optional main HDD 115M among one or more main HDD 115M, and then issues, via the main HDD 115M, a bypass cancellation instruction (S33) to the disk connector 111B related to the disk connector 111A for which restoration has been detected (that is, the disk connector 111B in the same disk enclosure 117 as the disk connector 111A).

The disk connector 111B, which has received this instruction, then issues (S34) a bypass cancellation instruction to the PBC 101A and 103A of the disk connector 111A for which restoration has been detected, via the path switching control line 18.

The PBC 101A and 103A, which have received the bypass cancellation instruction, then cancel the bypass of the disk connector 111A (S35). That is, the PBC 101A and 103A switch the communication path between the PBC 101A and 103A from the ENC bypass 113A to the fiber channel loop 180A of the disk connector 111A. At this time, the CTL 5A or 5B may display the fact that the bypass of the disk connector 111A for which restoration was detected has been cancelled on a display screen such as that of a management terminal (not shown) connected to the storage control system 120.

If a newly mounted ENC unit 14A is usable after the MPU 7A of the CTL 5A has performed a check on the usability of this ENC unit 14A (S36-1), the MPU 7A then updates (S36) the content of the ENC management table 31A, LU management table 33A, and so forth on the basis of the ENC number of the disk connector 111A for which loop restoration was detected, the number of the disk enclosure 117A in which the disk connector 111A is mounted, and so forth.

More specifically, for example, the MPU 7A of the CTL 5A updates usability information corresponding with the ENC number and disk enclosure number relating to the disk connector 111A for which loop restoration was detected from information indicating that the disk connector 111A is unusable to information indicating that same is usable, and renders a state in which the access flag corresponding with the ENC number has been lowered. Further, the MPU 7A of the CTL 5A may update at least one of the ENC management table 31B and LU management table 33B of the CTL 5B via the dual bus 30.

Figure 9:
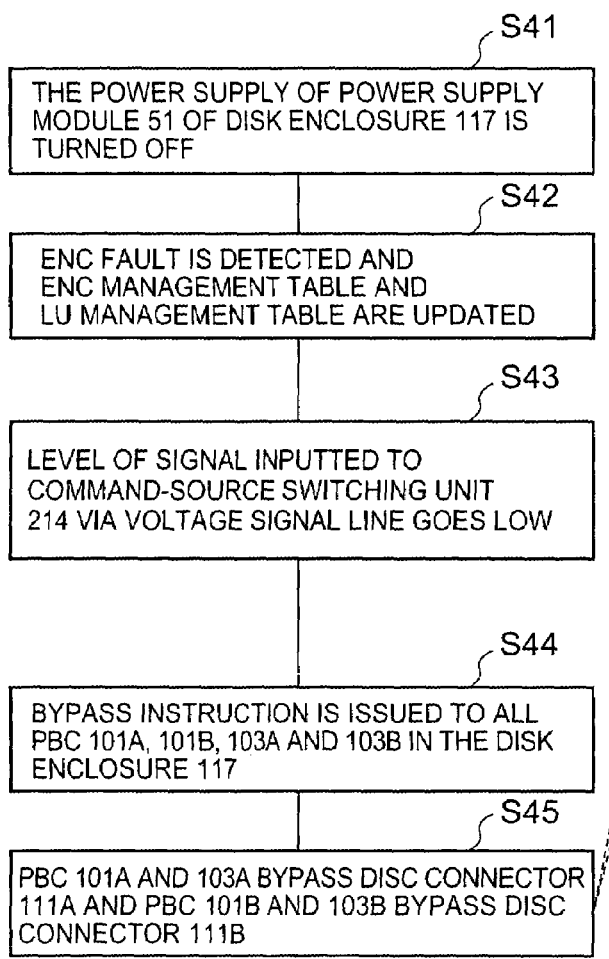
FIG. 9 shows an example of the process flow that is executed when the power supply of the power supply modules 51, 51 of a certain disk enclosure 117 is disconnected.
Figure 10:
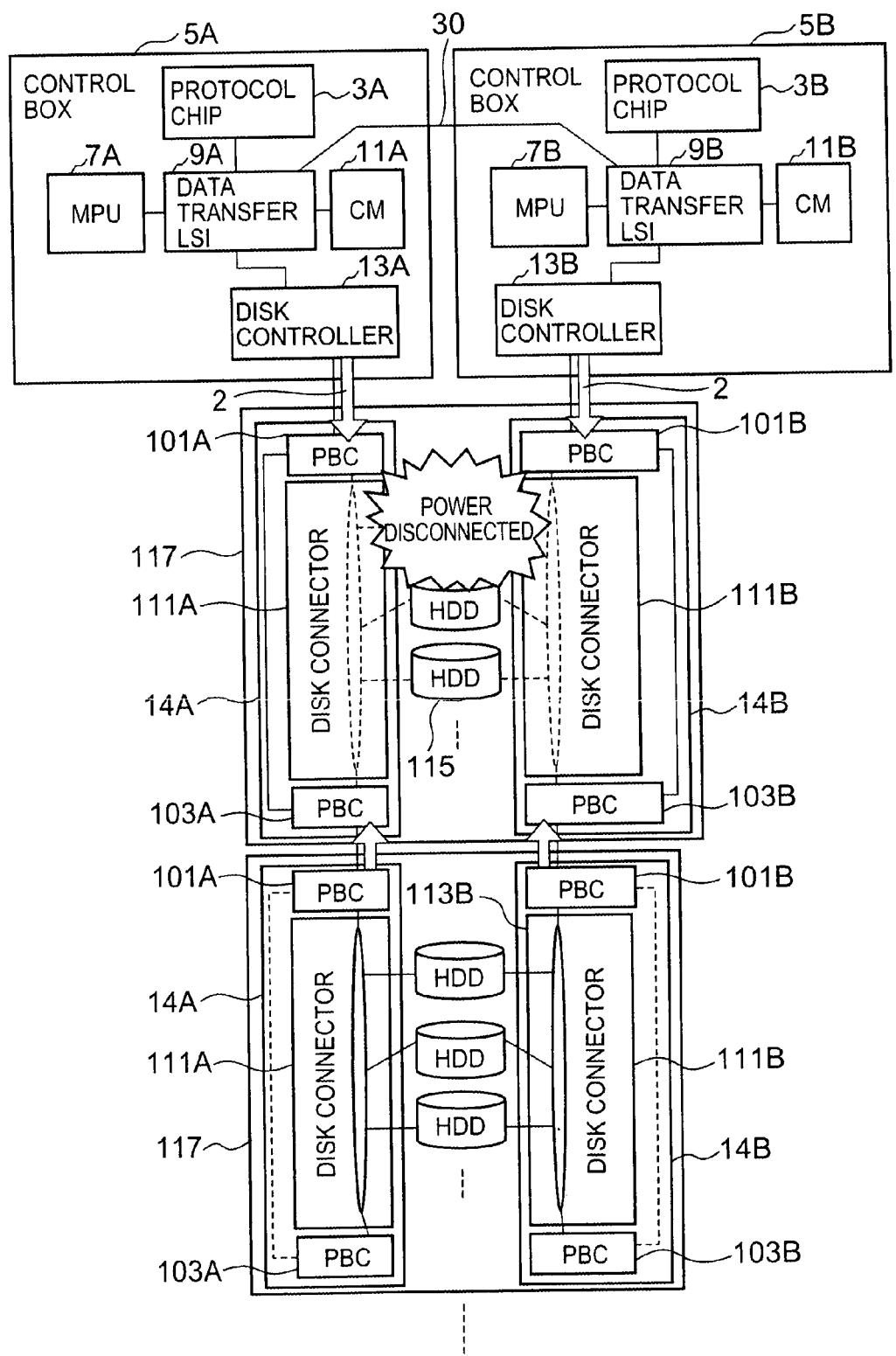
FIG. 10 serves to illustrate an aspect in which electricity is supplied to the PBC 101A, 101B, 103A, and 103B in the disk enclosure 117.

FIG. 9 shows an example of the process flow that is executed when the power supply of the power supply modules 51, 51 of a certain disk enclosure 117 is disconnected. FIG. 10 serves to illustrate an aspect in which electricity is supplied to the PBC 101A, 101B, 103A, and 103B in the disk enclosure 117 in this process flow.

For example, when the power supply of the power supply modules 51, 51 corresponding with the leading disk enclosure 117 on the write upstream side is turned OFF (S41), the power supply unit 402 of each PBC in the disk enclosure 117 then detects the turned OFF state and supplies electric power to the PBC from another power supply module 51. Furthermore, the CTL 5A and 5B detect the ENC units that comprise a disk connector for which SES access has been disabled by the disconnection of power and updates the content (S42) of the ENC management tables 31A and 31B and the LU management tables 33A and 33B. The updated content is then rendered the same as in a case where a fault occurs with both the disk connectors 111A and 111B in the same disk enclosure 117, for example.

In addition, in the case of S41, a low-level voltage signal is inputted to the command-source switching unit 214 (S43). The command-source switching unit 214 sends a bypass instruction to the PBC 101A, 103A, 101B and 103B via the path switching control line 18 (S44).

The PBC 101A and 103A, which have received the bypass instruction, then bypass the disk connector 111A and the PBC 101B and 103B likewise bypass the disk connector 111B (S45).

As a result of the above process flow, as shown in FIG. 10, with the power-off of the disk enclosure 117 having been detected, the path for the supply of power to each of the PBC 101A, 101B, 103A, and 103B of the disk enclosure 117 whose power supply is turned OFF is automatically switched, and a bypass instruction is inputted to the PBC 101A, 101B, 103A, and 103B. Thus, as shown by the solid lines in FIG. 10, a state where the ENC bypasses 113A and 113B of the disk enclosure 117A are selected is then assumed.

Figure 11:
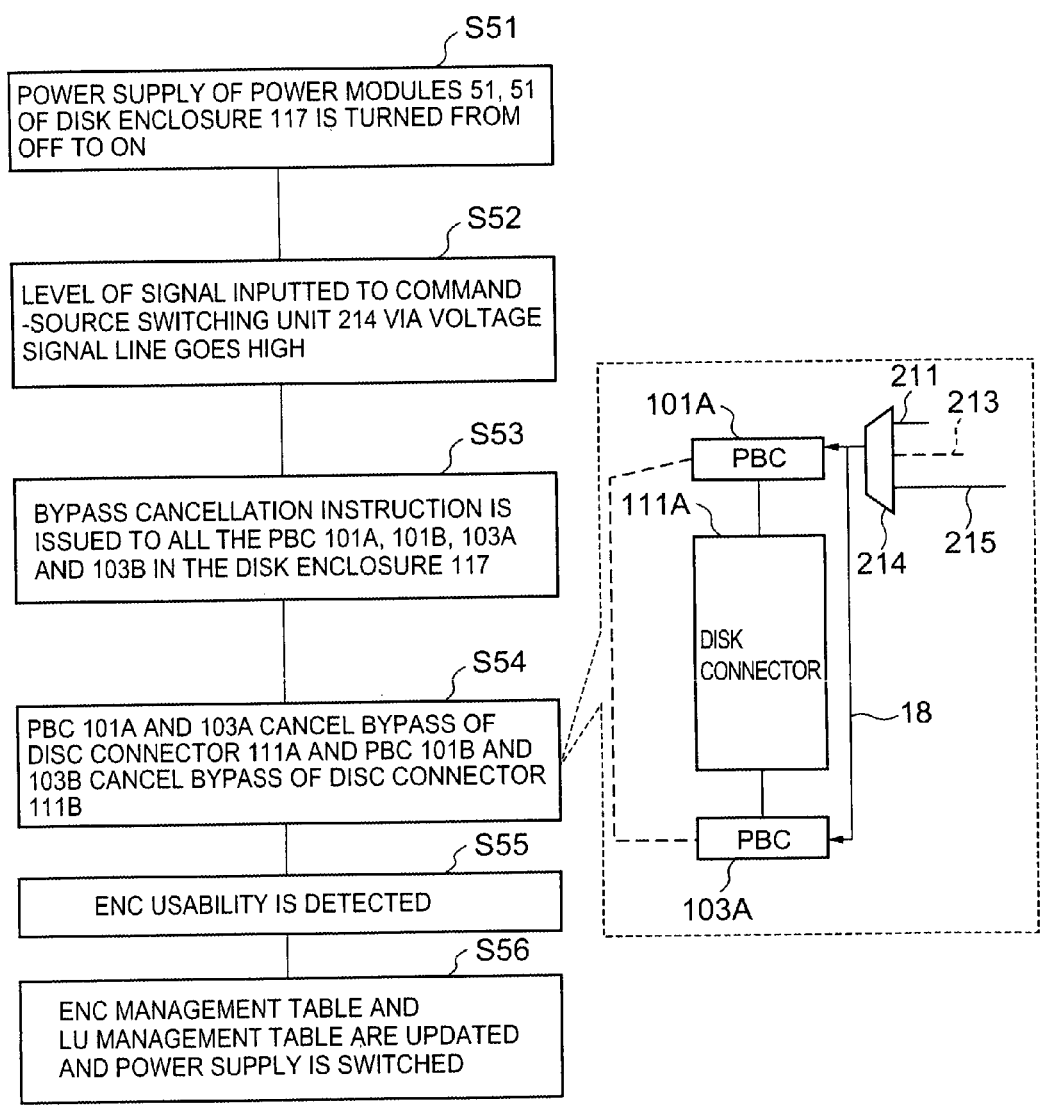
FIG. 11 shows an example of the process flow that is executed when the power supply of the power supply modules 51, 51 of a certain disk enclosure 117 changes from an OFF state to an ON state.
Figure 12:
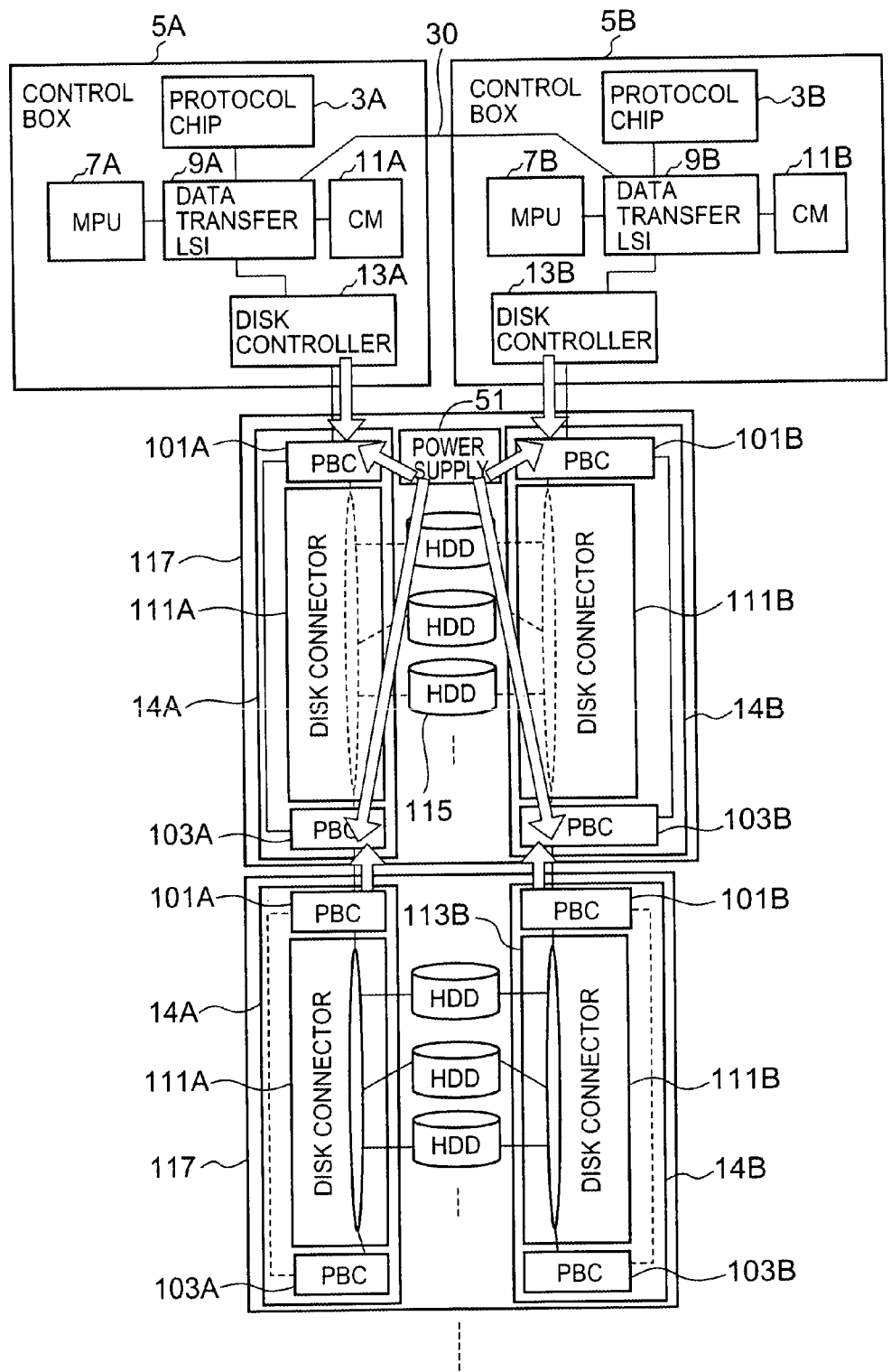
FIG. 12 serves to illustrate an aspect in which electricity is supplied to the PBC 101A, 101B, 103A, and 103B in the disk enclosure 117.

FIG. 11 shows an example of the process flow that is executed when the power supply of the power supply modules 51, 51 of a certain disk enclosure 117 changes from an OFF state to an ON state. FIG. 12 serves to illustrate an aspect in which electricity is supplied to the PBC 101A, 101B, 103A, and 103B in the disk enclosure 117 in this process flow.

For example, when the power supply of the power supply modules 51, 51 corresponding with the leading disk enclosure 117 on the write upstream side changes from an OFF state to an ON state (S51), electric power from the power supply module 51 corresponding with the disk enclosure 117 and electric power from another enclosure are selectively supplied to each PBC in the disk enclosure 117 as shown in FIG. 12.

Further, in the case of S51, a high-level voltage signal is inputted to the command-source switching unit 214 (S52), and the command-source switching unit 214 then sends a bypass cancellation instruction to the PBC 101A, 103A, 101B, and 103B (S53) via the path switching control line 18.

The PBC 101A and 103A, which have received the bypass cancellation instruction, cancel the bypass of the disk connector 111A, and the PBC 101B and 103B likewise cancel the bypass of the disk connector 111B (S54). Further, the CTL 5A and 5B detect that the ENC units 14A and 14B are usable (S55), and then update the content of the ENC management tables 31A and 31B, and the LU management tables 33A and 33B (S56). The updated content is the same content as for a case where the disk connectors 111A and 111B in the same disk enclosure 117 are restored, for example.

As a result of the above process flow, as shown in FIG. 11, with the power supply of the disk enclosure 117 turning from OFF to ON having been detected, the path for the supply of power to each of the PBC 101A, 101B, 103A and 103B of the disk enclosure 117 whose power supply is then ON is automatically switched to the original path, and a bypass cancellation instruction is inputted to the PBC 101A, 101B, 103A and 103B. As shown by the solid lines in FIG. 10, a state where the fiber channel loop of each of the disk connectors 111A and 111B of the disk enclosure 117A is selected is assumed.

A description of this embodiment was provided above. Although, in the above description, the focus was on one of duplicate parts of the storage control system 120 in order to make the description easier to understand, it is understood that the items mentioned in the foregoing description can also be applied to the respective other parts.

Figure 13:
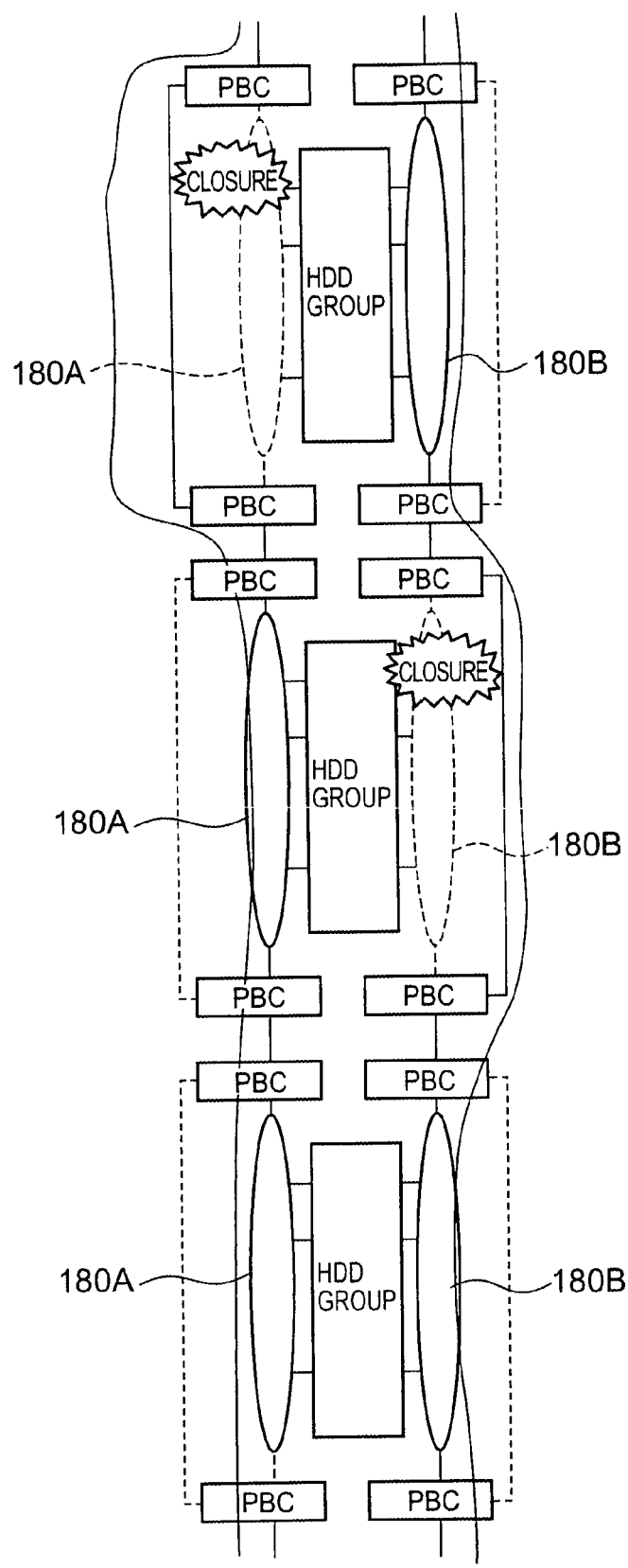
FIG. 13 serves to illustrate the utility of an embodiment of the present invention.

According to the above description, each disk enclosure 117 contains the ENC bypass 113A for the disk connector 111A, and PBC 101A and 103A for selectively switching the transfer of data via either the disk connector 111A or the ENC bypass 113A. As a result of this constitution, even when an anomaly occurs in the disk connector 111A (a fault occurs therein or the power supply of same is disconnected, for example) and data communications can no longer be executed via the disk connector 111A, switching the data communication path from the disk connector 111A to the ENC bypass 113A by controlling the PBC 101A and 103A makes it possible for data to be exchanged between the controller unit 5A and the HDD 115 that exists on the write downstream side of the disk connector 111A via the ENC bypass 113A of the failed disk connector 111A. Stated from a different standpoint, even when a fault occurs with a module on the fiber channel loop (hereinafter 'FC loop'), the effects of the fault on the whole loop can be avoided by means of a module unit bypass and closure of the whole loop is prevented. That is, as illustrated in FIG. 13, although there is a first large loop constituted by a plurality of serially connected first FC loops 180A and a second large loop constituted by a plurality of serially connected second FC loops 180B in this embodiment, even when any given FC loop of any large loop closes, because the two FC loops between which the closed FC loop is interposed are connected via the ENC bypass of the closed FC loop, closure of the whole of the large loop can be prevented.

Further, several embodiment examples may be considered for this embodiment.

EMBODIMENT EXAMPLE 1

Figure 14:
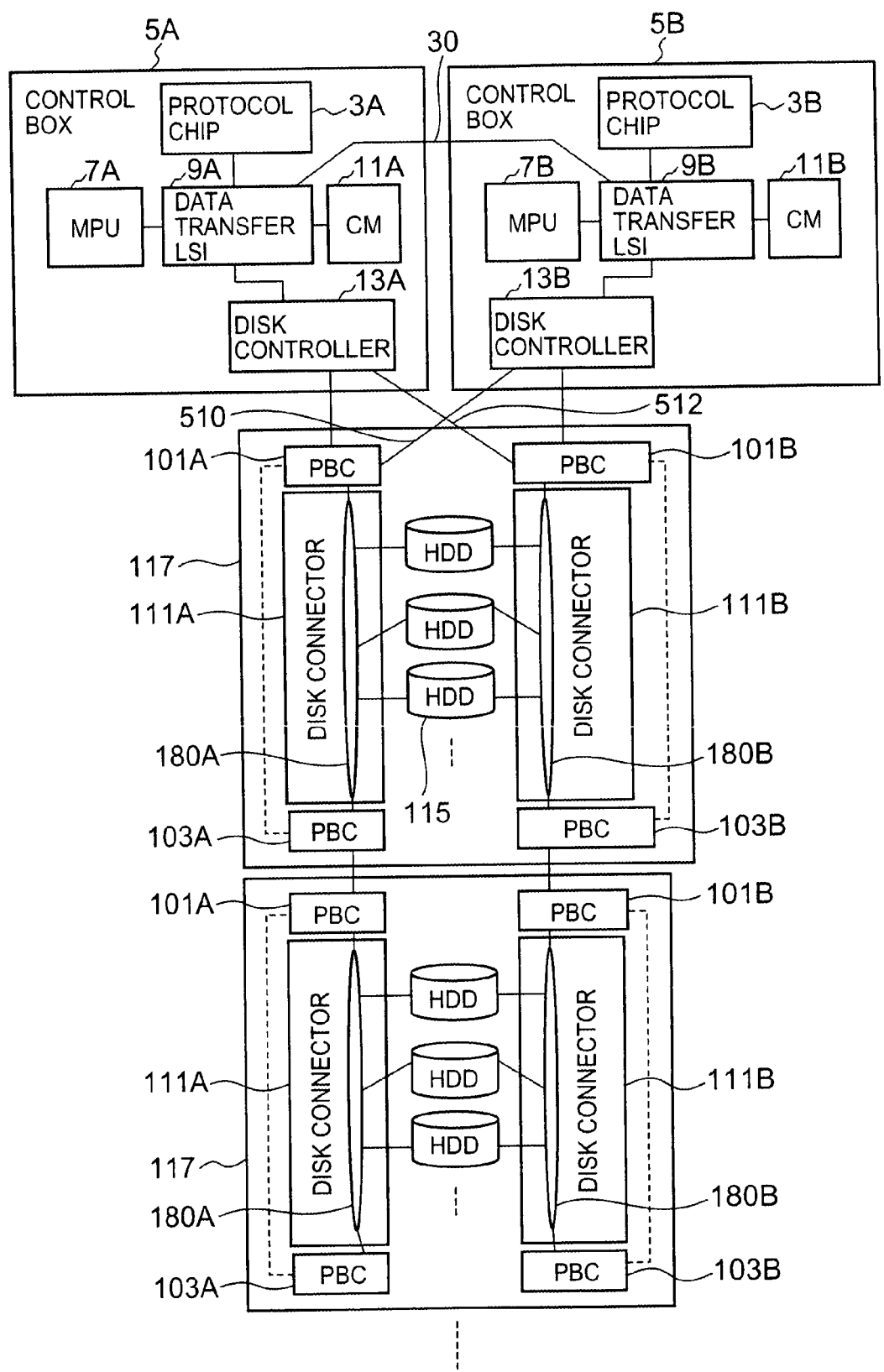
FIG. 14 shows parts relating to the data transfer of the storage control system 120 relating to a first embodiment example of an embodiment of the present invention.

FIG. 14 shows parts relating to the data transfer of the storage control system 120 relating to a first embodiment example of an embodiment of the present invention.

A first alternate path 510 is provided between the CTL 5B and PBC 101A. Further, a second alternate path 512 is provided between the CTL 5A and PBC 101B. In this case, when it is detected that a fault has occurred with the disk connector 111A, for example, the CTL 5A is able to access each disk connector 111B under the management of CTL 5B directly via the second alternate path 512.

EMBODIMENT EXAMPLE 2

Figure 15:
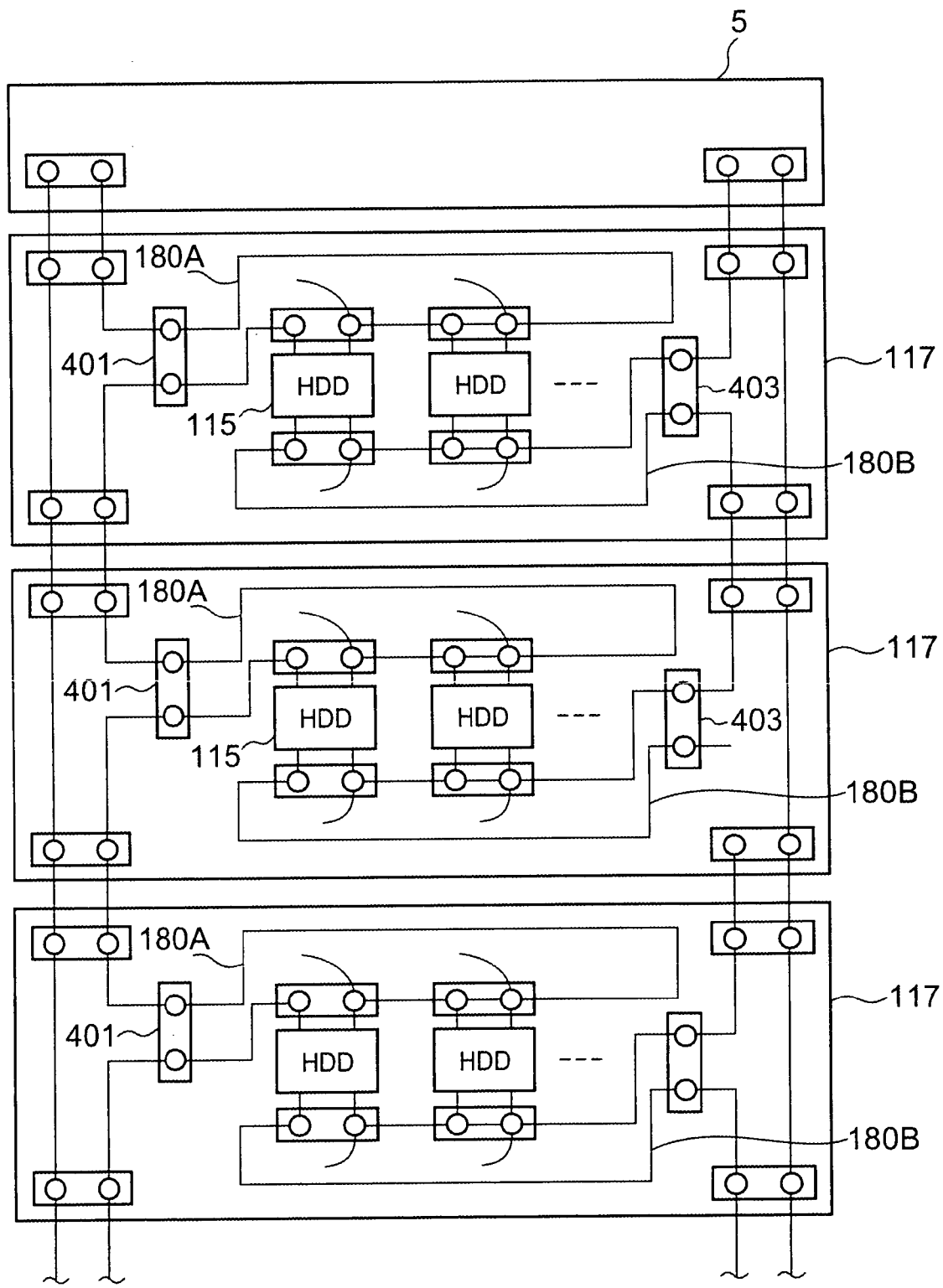
FIG. 15 shows an example of a fiber channel loop connection for a controller unit and disk enclosures.

FIG. 15 shows an example of a fiber channel loop connection for a controller unit and disk enclosures.

In the second embodiment example, the leading disk enclosure 117 among the plurality of serially connected disk enclosures 117 is connected to one controller unit 5. Two FC loops 180A and 180B exist in each disk enclosure 117 and a plurality of HDD 115 is connected to the FC loops 180A and 180B respectively (the illustrated example is an example in which one HDD 115 can be accessed by two FC loops 180A and 180B). A first large loop is formed by a plurality of serially connected FC loops 180A and a second large loop is formed by a plurality of serially connected FC loops 180B.

Each disk enclosure 117 comprises a first fiber channel switch (FC-SW hereinbelow) 401 that disconnects the FC loop 180A from the first large loop and passes the first large loop to the next disk enclosure 117, and a second FC-SW 403 that disconnects the FC loop 180B from the second large loop and passes the second large loop to the next disk enclosure 117.

Therefore, the following effects can be expected as a result of disconnecting the FC loops 180A and 180B by means of FC-SW 401 and 403.

For example, there have been reports that, the life of a SATA (serial ATA) drive can be prolonged by stopping the drive at regular intervals. On this basis, a method that involves stopping the drive at regular intervals may be considered as one measure for prolonging the life of the drive. Furthermore, when a SATA drive is used as a mail archive or backup disk, a method according to which the relevant side of the SATA drive cannot be accessed once same has been written, and the drive is only operated at the time of a backup may also be considered.

As the implementation method, a method that stops the operation at the drive unit level may be considered. However, in the second embodiment example, a disconnection of the power supply is permitted for each disk enclosure 117 (or ENC unit (not shown)) by mounting the above-mentioned FC-SW 401 and 403. Because each FC-SW 401, 403 receives a supply of electric power via the inside of the FC cables connected to the FC-SW 401, 403, for example, even when the power supply is disconnected for each disk enclosure 117 (or ENC unit (not shown)), the disconnection of the FC loops 180A and 180B and so forth can be controlled.

As described above, the operation can be controlled for each disk enclosure 117 (or ENC unit (not shown)), and this is therefore useful for the conservation of power and as a sound-proofing measure, and so forth. Further, even when the power supply is disconnected for each disk enclosure 117 (or ENC unit (not shown)), electric power is then only supplied to the FC-SW 401, 403 (stated in terms of the above embodiment, the respective PBC101A, 101B, 103A, and 103B).

Although the preferred embodiment of the present invention and several embodiment examples were described above, such embodiments merely serve to illustrate the present invention, there being no intention to limit the scope of the present invention to these embodiments and embodiment examples. The present invention can also be implemented by means of a variety of other embodiments.

For example, in place of the HDD 115, another type of physical storage device (one example of which is a DVD (Digital Versatile Disk) or other optical disk, magnetic tape recording medium, or semiconductor memory) may be adopted.

Further, for example, the bypass may be provided in a predetermined number of HDD units, for example, instead of in disk connector units, whereby control that is more detailed can be achieved.

Moreover, for example, a control line may be provided between the CTL 5A and the PBC 101A and 103A respectively. In this case, upon detecting a fault with a certain disk connector 11A, the CTL 5A may cause the PBC 101A and 103A to perform path switching control by issuing a bypass instruction to the PBC 101A and 103A that comprise the ENC bypass 113A of this certain disk connector 111A via the control line.

The invention claimed is:

1. A storage control system, comprising:
a plurality of storage devices for storing data;
a controller that controls the writing of data to the plurality of storage devices and the reading of data from the plurality of storage devices; and
a connection system that connects the controller to the plurality of storage devices, wherein
the connection system comprises a plurality of device connectors connected to the plurality of storage devices; a plurality of bypasses corresponding to the plurality of device connectors, respectively; and a plurality of path switching units, each of which includes at least two of said plurality of bypasses, the plurality of path switching units being connected to corresponding ones of the plurality of device connectors, respectively, and to perform selective switching so as to connect either a corresponding device connector or a corresponding bypass of the corresponding device connector to the controller;
the plurality of path switching units are serially connected between an upstream side where the controller is present and a downstream side where the plurality of storage devices is present;
each of the plurality of path switching units connects the corresponding device connector to the controller when the corresponding device connector is normal, and switches connection of the controller from the corresponding device connector to the corresponding bypass thereof when an anomaly occurs in the corresponding device connector; and
the controller accesses, via the bypass of the device connector exhibiting the anomaly, another device connector that exists further downstream than the device connector exhibiting the anomaly.

2. The storage control system according to claim 1, wherein the controller and the connection system are multiplexed, respectively;
multiplexed controllers comprise first and second controllers;
multiplexed connection systems comprise a first connection system connected to the first controller and a second connection system connected to the second controller;
two or more of the plurality of the device connectors included in the first connection system comprise a first device connector;

two or more of the plurality of the device connectors included in the second connection system comprise a second device connector corresponding to the first device connector;
the first device connector is provided with a corresponding first path switching unit;
the second device connector is provided with a corresponding second path switching unit;
the first path switching unit is connected to the second controller;
the second path switching unit is connected to the first controller;
the first controller detects the occurrence of an anomaly in the first device connector and sends a bypass command, which signifies an instruction to bypass the first device connector, to the second controller;
the second controller receives the bypass command from the first controller and then sends a bypass request signal, which signifies a request to connect the bypass of the first device connector to the first controller, to the first path switching unit; and
the first path switching unit receives the bypass request signal and switches the path connecting to the first controller from the first device connector to the bypass thereof.

3. The storage control system according to claim 1, wherein the controller and the connection system are multiplexed, respectively;
multiplexed controllers comprise first and second controllers;
multiplexed connection systems comprise a first connection system connected to the first controller and a second connection system connected to the second controller;
two or more of the plurality of device connectors included in the first connection system comprise a first device connector;
two or more of the plurality of device connectors included in the second connection system comprise a second device connector corresponding to the first device connector;
the first device connector is provided with a corresponding first path switching unit;
the second device connector is provided with a corresponding second path switching unit;
the first device connector is connected to the second path switching unit; the second device connector is connected to the first path switching unit;
the first controller detects the occurrence of an anomaly in the first device connector and sends a bypass command, which signifies an instruction to bypass the first device connector, to the second controller;
the second controller receives the bypass command from the first controller and then sends a bypass request signal, which signifies a request to connect the bypass of the first device connector to the first controller, to the first path switching unit via the second device connector; and
the first path switching unit receives the bypass request signal and switches the path connecting to the first controller from the first device connector to the bypass thereof.

4. The storage control system according to claim 2, wherein the first and second controllers are connected to each other and to a host device of the storage control system;
the first controller receives write target data from the host device and, when the write destination of the received write target data is a storage device connected to the first device connector, transfers the received write target data to the second controller; and the second controller receives write target data from the first controller and writes the received write target data to the storage device connected to the first device connector via the second device connector.

5. The storage control system according to claim 1, further comprising:

a plurality of power supplies corresponding with the plurality of device connectors and the plurality of path switching unIts;

a plurality of power supply detection units for detecting respective states of the plurality of power supplies; and a plurality of power supply switching units corresponding to the plurality of path switching units, wherein each of the plurality of power supply detection units detects whether a corresponding one of the plurality of power supplies therewith is OFF, notifies the power supply switching unit of the path switching unit corresponding to the power supply, and sends, to the path switching unit corresponding to the power supply, a bypass request signal signifying a request to connect the bypass of the device connector corresponding to the path switching unit to the controller; and each of the plurality of power supply switching units performs selective switching to adopt, for the path switching unit corresponding to the respective power supply switching unit, either the power supply corresponding with the path switching unit or the power supply corresponding with another path switching unit, receives notification from the respective power supply detection unit that the power supply of the path switching unit corresponding to the respective power supply switching unit is OFF, and then connects, to the path switching unit corresponding to the respective power supply switching unit, the power supply corresponding to a path switching unit other than the path switching unit.

6. The storage control system according to claim 1, wherein each of the Plurality of path switching units comprises two bypass circuits connected to both ends of the corresponding bypass;

the two bypass circuits are an upstream-side bypass circuit and a downstream- side bypass circuit;

the upstream-side bypass circuit is connected to a device connector corresponding therewith and to a downstream-side bypass circuit of a path switching unit corresponding to another device connector further upstream than the device connector corresponding to the upstream-side bypass circuit; and the downstream-side bypass circuit is connected to a device connector corresponding therewith and to an upstream-side bypass circuit of a path switching unit corresponding to another device connector further downstream than the device connector corresponding to the downstream-side bypass circuit.

7. The storage control system according to claim 1, wherein each of the plurality of path switching units switches connection to the controller from the corresponding bypass to corresponding device connector when the corresponding device connector exhibiting an anomaly has been restored.

8. The storage control system according to claim 1, wherein each of the plurality of device connectors comprises a fiber channel loop connected to a storage device;

a plurality of fiber channel loops are serially connected between an upstream side and a downstream side; and each of the plurality of the path switching units comprises a fiber channel loop bypass provided between one fiber channel loop and an adjacent fiber channel loop.

9. An operating method for a storage control system, wherein the storage control system comprises a plurality of storage devices for storing data; a controller that controls the writing of data to the storage devices and the reading of data from the storage devices; and a connection system that connects the controller to the plurality of storage devices;

the connection system comprises a plurality of device connectors connected to the plurality of storage devices; a plurality of bypasses corresponding to the plurality of device connectors respectively; and a plurality of path switching units, each of which includes two or more of the plurality of bypasses, the plurality of path switching units being connected to the plurality of device connectors respectively, and performs selective switching to connect either a corresponding device connector or a corresponding bypass of the corresponding device connector to the controller;

the plurality of path switching units are serially connected between an upstream side where the controller is present and a downstream side where the plurality of storage devices is present;

the operating method comprising the steps of:

switching connection of the controller from a device connector to a corresponding bypass thereof when an anomaly occurs in the device connector; and accessing, via the corresponding bypass of the device connector exhibiting the anomaly, another device connector that exists further downstream than the device connector exhibiting the anomaly.

* * * * *